United States Patent [19]
Hollingsworth

[11] Patent Number: 6,079,105
[45] Date of Patent: *Jun. 27, 2000

[54] CABLE SHEATH STRIPPING TOOL

[76] Inventor: Elmont Hollingsworth, 12100 Wander La., Austin, Tex. 78750

[ * ] Notice: This patent is subject to a terminal disclaimer.

[21] Appl. No.: 09/237,330

[22] Filed: Jan. 26, 1999

[51] Int. Cl.⁷ .............................. H02G 1/12; B21F 13/00; B26B 3/00
[52] U.S. Cl. .............................. 30/90.4; 30/90.8; 30/278; 30/289; 30/351; 81/9.44
[58] Field of Search .................................... 30/90.4, 90.1, 30/90.8, 91.1, 91.2, 92.5, 351, 353, 355, 280, 279.4, 282, 287, 289, 293, 294, 314, 317; 81/9.4, 9.42, 9.43, 9.44; 29/764

[56] References Cited

U.S. PATENT DOCUMENTS

| | | | |
|---|---|---|---|
| 964,600 | 7/1910 | Adams | 30/91.1 X |
| 2,817,255 | 12/1957 | Lormeau | 30/91.2 |
| 2,903,064 | 9/1959 | Blonder | 30/90.4 |
| 4,083,105 | 4/1978 | ViPond | 30/90.4 |
| 5,325,593 | 7/1994 | Chen | 30/279.6 |
| 5,491,894 | 2/1996 | Bieganski | 30/90.1 |
| 5,535,519 | 7/1996 | Brimmer | 30/90.1 |
| 5,829,322 | 11/1998 | Chen | 81/9.44 |

*Primary Examiner*—Rinaldi I. Rada
*Assistant Examiner*—Boyer Ashley

[57] ABSTRACT

A tool including a handle, a blade-carrying portion attached to a first portion of the handle and a guide portion attached to a second portion of the handle. The second portion of the handle is movable with respect to the first portion of the handle thereby defining a variable distance between the blade-carrying portion and the guide portion. The guide portion includes a channel defining a longitudinal axis and a blade including two opposing ends and a generally u-shaped portion having a cutting edge thereon. The u-shaped portion is attached between the two opposing ends of the blade and the two opposing ends are pivotally attached to the blade-carrying portion. The blade is pivotable between a first cutting position and a second cutting position with respect to the blade-carrying portion. The blade defines a first cutting direction when in the first cutting position and defines a second cutting direction when in the second cutting position. The second cutting direction is approximately parallel to the longitudinal axis. A blade guide is attached to the blade. A tool according to the present invention permits an elongated sliver of insulation to be striped from adjacent to an intermediate conductor of a multi-conductor cable.

18 Claims, 4 Drawing Sheets

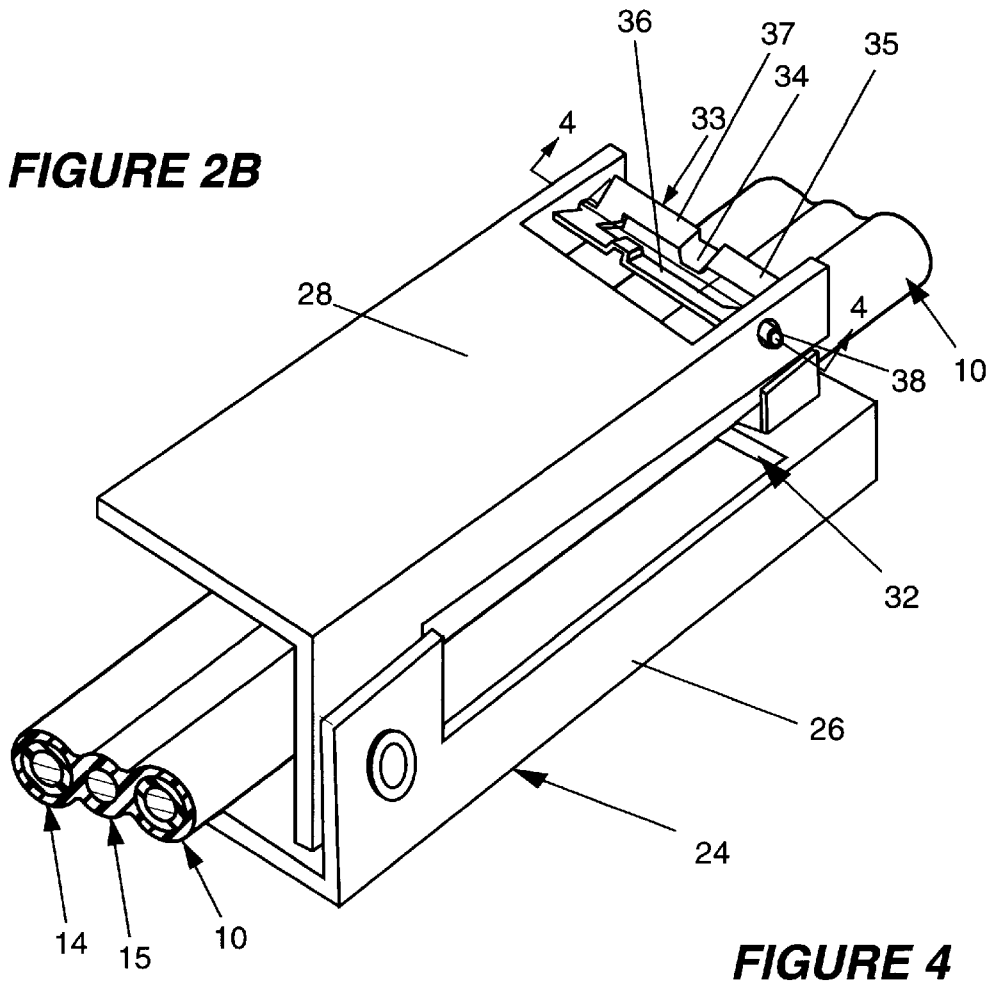
FIGURE 2B
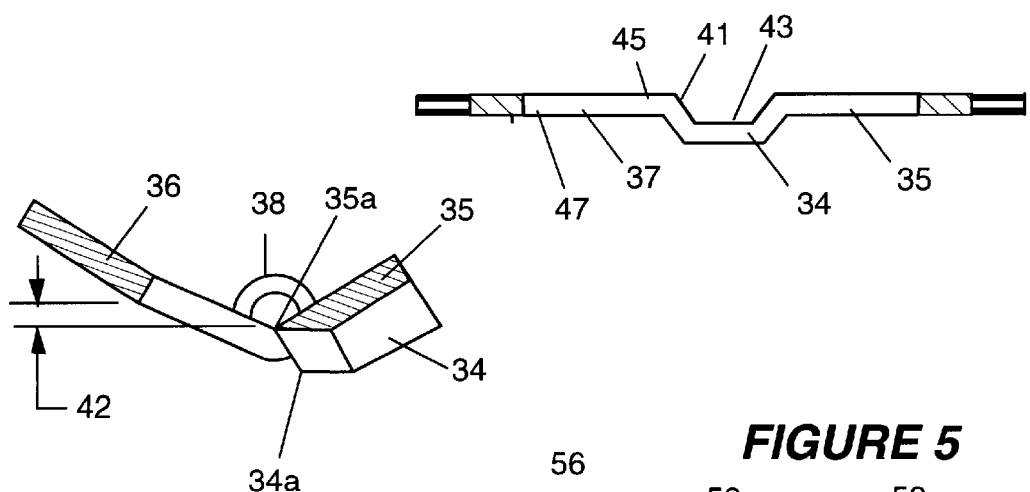
FIGURE 4
FIGURE 3
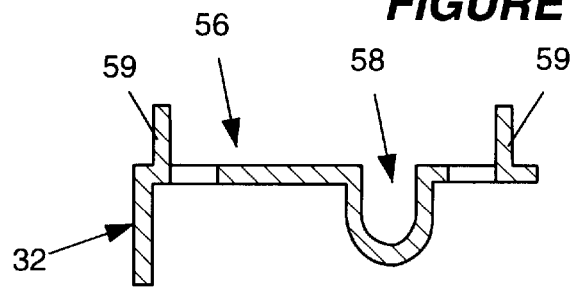
FIGURE 5

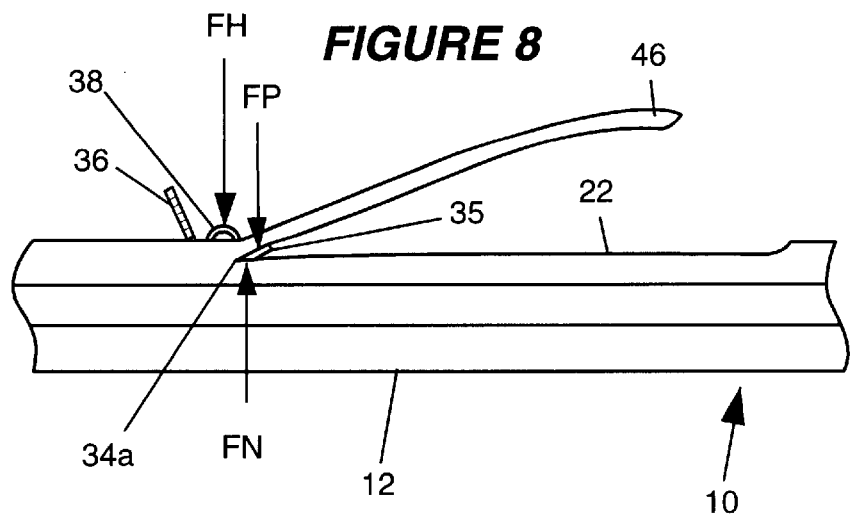
FIGURE 8
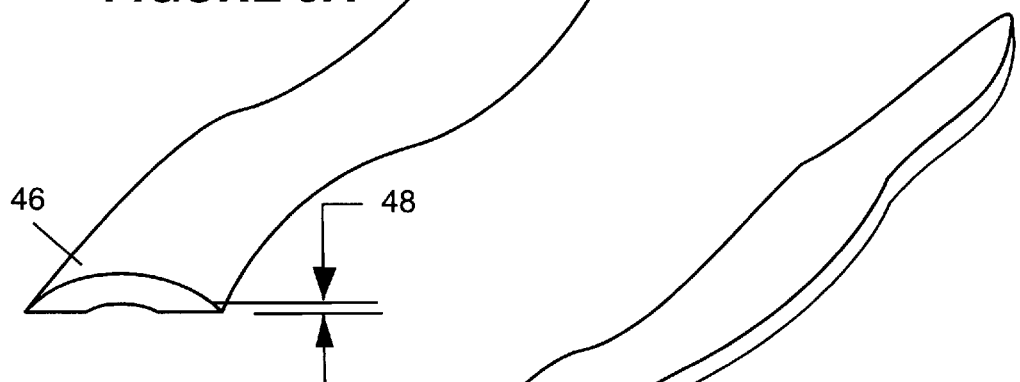
FIGURE 9A
FIGURE 9B
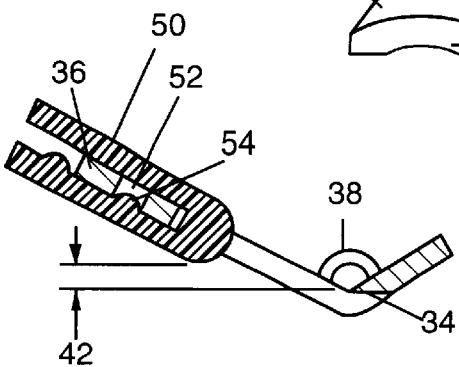
FIGURE 10

CABLE SHEATH STRIPPING TOOL

BACKGROUND

This invention relates generally to wire and cable strippers. More particularly this invention relates to a hand-held stripping tool for removing a sliver-like segment of the outer sheath from a flat multi-conductor cable. The stripper of the present invention is configured to longitudinally strip the sheath from a flat multi-conductor cable without damaging the underlying contents of the cable.

The stripping of cables is a common aspect of modifying, constructing, and maintaining electrical equipment and facilities. Common types of cables include multi-conductor cables such as "ROMEX" brand cable sold by General Cable Corporation for distributing power. These types of cables typically have three or more conductors protected in a sheath. At least two of the conductors are typically individually insulated in addition to having the protective sheath. Depending on the country and the application, the construction of these types of flat cables may vary slightly, but the overall constructions are quite similar.

When stripping flat multi-conductor cables, it is necessary to slit or strip the outer sheath to gain access to the interior contents and then strip the insulation from the individually insulated wires to expose the conductors. Regardless of the type of cable being prepared, it is desirable to slit or strip the outer sheath without damaging the underlying insulation or conductor.

There are a number of prior art tools and methods for accomplishing the stripping of the sheath of a flat multi-conductor cable. A common method is to use a pocketknife to slit the sheath along the longitudinal axis of the cable and then make a cut around the circumference to remove the severed portion of the sheath and expose the conductors. Although this method will suffices it has the potential of damaging the insulation on the individual conductors. Furthermore, physical injury to the party stripping the cable is also possible. To simplify the process of stripping these types of cables, many types of specialized tools have been developed and are well know in the art.

U.S. Pat. No. 4,951,393 to Wallace discloses a cable stripper especially adapted for stripping multi-conductor cable such as "ROMEX" brand cables. Wallace teaches a tool having a blade for slitting the outer sheath of the cable to a depth approximately equal to the thickness of the sheath material. The tool may further include a separate blade arrangement having a plurality of sharpened circular openings for stripping the insulation from the individual insulated wires. The tool disclosed by Wallace includes a guide for controlling the depth of the slit in the sheath. However variations in the thickness of the sheath, selection of different size cables, and variations in the pressure applied to the slitting blade during operation will result in a slit depth that is either slightly greater or less than the thickness of the sheath. A slitting depth slightly less than the sheath thickness will result in the sheath being difficult to remove and a slitting depth slightly greater than the sheath thickness can inadvertently damage the insulation on the individual insulated wires. Furthermore, the tool as taught by Wallace does not readily allow for longitudinal stripping long lengths of the insulation from insulated wires.

U.S. Pat. No. 5,535,519 to Brimmer also teaches a tool for stripping insulation from a cable. Brimmer teaches a tool that comprises a pair of handles similar to that of pliers. However, the handles operate a pair of jaws adapted for cutting insulation. Each jaw includes a series of semi-circular cutting edges that combine to form a series of circular openings when the jaws are in the closed position. Each jaw also carries non-circular cutting edges that combine to form a dumbbell-shaped opening when the jaws are in the closed position. The cutting edges are sharpened such that they can cut the insulation and allow it to be removed. The series of circular openings allow for round insulated wires of varying diameters to be stripped without appreciably damaging the conductor. The dumbbell-shaped opening is useful in stripping the outer sheath from cables such as "ROMEX" brand multi-conductor cables. The tool as taught by Brimmer does not readily allow for longitudinal slitting or stripping of insulation from conductors.

U.S. Pat. No. 5,325,593 to Chen teaches a double bladed vegetable peeler having pivotally mounted blades and guides similar to that contemplated for the present invention. As the disclosed and claimed utility of the peeler is for removing the skin from a vegetable or fruit, an element or elements for guiding the tool along the longitudinal axis of a wire or cable is not disclosed. Without such a guiding element or elements, the orientation of the wire or cable relative to the tool and the force applied between the blade and the wire or cable would not be controllable. This uncontrolled stripping operation would result in the strip depth and location of the insulation or sheath to be inconsistent, causing damage to an underlying insulation or conductor.

Accordingly, a need has arisen for a cable sheath stripping tool that overcomes the shortcomings of the prior techniques and tools. The tool disclosed herein strips the sheath from a flat multi-conductor cable along the longitudinal direction of the cable without damaging the underlying conductor or their insulation, if so insulated. The tool adjusts for sheaths having different thickness. Furthermore, the tool is constructed to slit to a depth approximately equal to the thickness of the sheath without significant skill of the user. For flat multi-conductor cables with three or more conductors in a sheath, the tool is configured to strip the sheath from adjacent the conductors at the edges of the cable as well as the sheath from adjacent at least one conductor positioned between the two outermost conductors.

SUMMARY

An improved solution for stripping the outer sheath from multi-conductor cables and insulation from conductors is needed. The tool will strip long lengths of the sheath from along the longitudinal axis of a cable, removing a sliver-like segment of sheath. The tool strips the sheath without damaging the underlying contents of the cable. To this end, a tool for stripping the sheath from a flat, multi-conductor cable includes a handle having a blade-carrying portion and a guide portion for guiding the tool along the longitudinal axis of the cable. The tool includes a blade having a generally u-shaped blade portion with an open end and a closed end. The u-shaped blade portion is disposed between a first and a second elongated blade member. Each blade member is attached at a first end to the open end of the u-shaped blade portion and is attached at a second end to the blade-carrying portion of the handle. The u-shaped blade portion has a respective cutting edge. A blade guide is attached to the blade.

BRIEF DESCRIPTION OF THE DRAWINGS

FIG. 2B is a perspective view showing an illustrative embodiment of a stripping tool with a cable positioned to strip the sheath adjacent an intermediate wire.

FIG. 3 is a cross-sectional view of the section 3—3 indicated in FIG. 2A.

FIG. 4 is a cross-sectional view of the section 4—4 indicated in FIG. 2B.

FIG. 5 is a cross sectional view showing an illustrative embodiment of the guide portion of the handle.

FIG. 8 is a side view showing the various forces on the blade during the stripping operation.

FIG. 9A is a perspective view showing the profile of a sliver-like section stripped from adjacent an exterior wire.

FIG. 9B is a perspective view showing the profile of a sliver-like section of sheath stripped from adjacent an intermediate wire.

FIG. 10 is a cross sectional view showing an illustrative embodiment of an adjustable blade guide in combination with a blade.

DETAILED DESCRIPTION

Figure 1A:
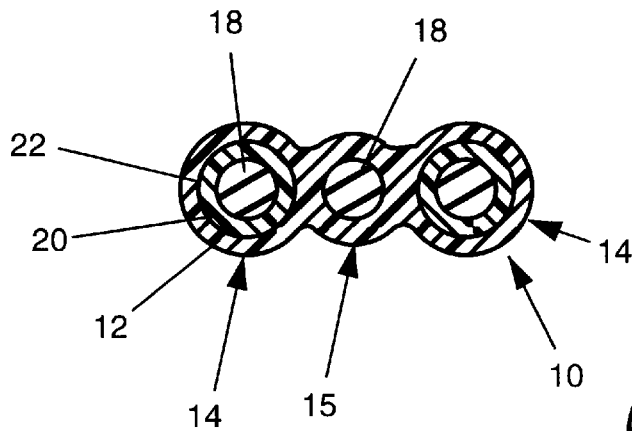
FIG. 1A is an end view of a flat multi-conductor cable having two insulated wires and one un-insulated wire in a sheath.
Figure 1B:
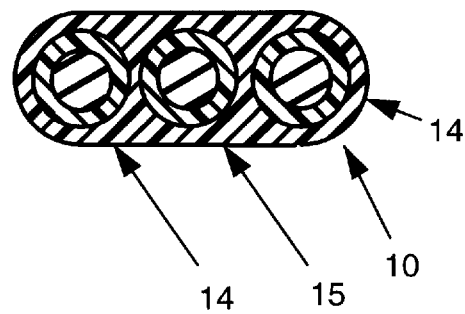
FIG. 1B is an end view of a flat multi-conductor cable having three insulated wires in a sheath.

As shown in FIG. 1A, a flat multi-conductor cable 10 will typically have an oblong cross-section and an outer sheath 12 around two exterior wires 14 with one or more intermediate wires 15 located between them. As shown in FIG. 1A, the exterior wires 14 will typically have a conductor 18 with a layer of insulation 20. Each intermediate wire 15 may have a wire 18 without insulation, as shown in FIG. 1A. An un-insulated intermediate wire 15 is typically included in the cable 10 for grounding purposes. As shown in FIG. 1B, the intermediate wire 15 may be insulated with an insulation 20. A sheath interface 22 is present between the sheath 12 and the layer of insulation 20. In the case of an uninsulated wire, FIG. 1A, a sheath interface 22 is present between the sheath 12 and the conductor 18. Depending on the type of cable and the manufacturer, the sheath may follow the contour of the individual wires (FIG. 1A) of have a generally flat surface (FIG. 1B).

Figure 2A:
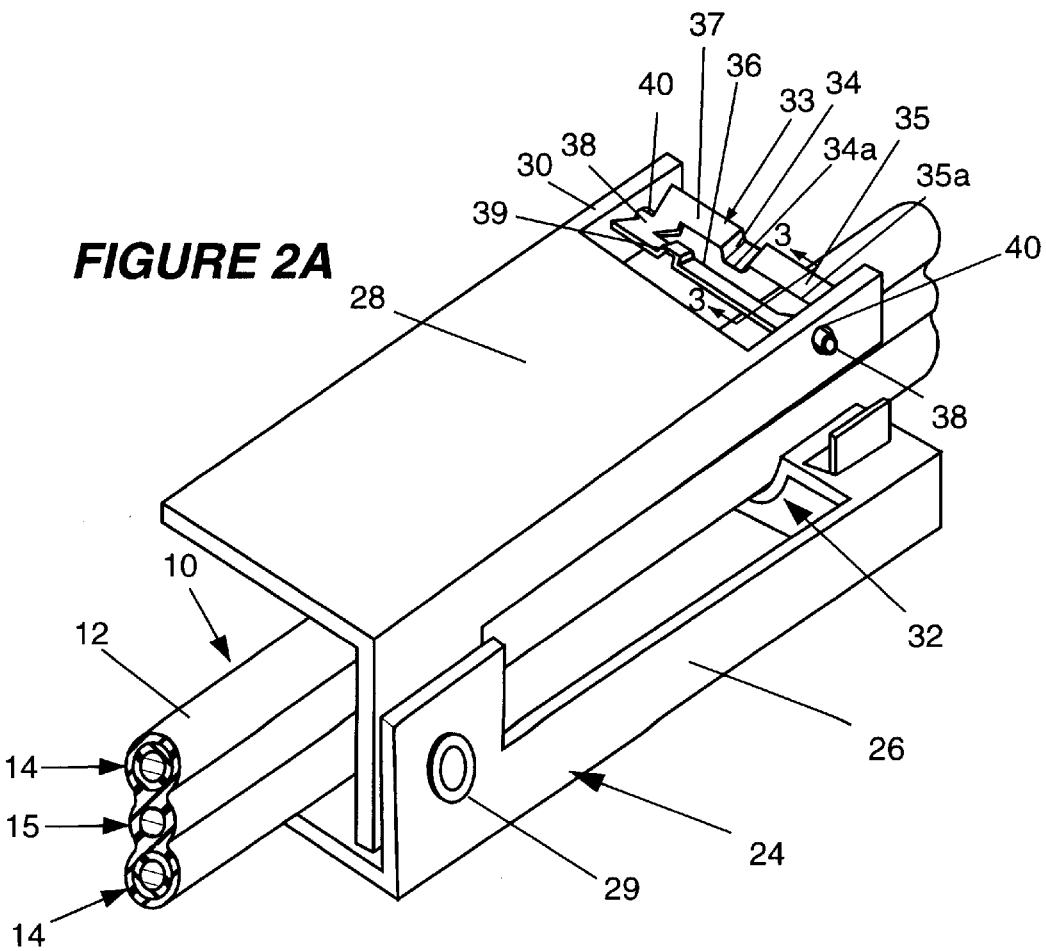
FIG. 2A is a perspective view showing an illustrative embodiment of a stripping tool with a cable positioned to strip the sheath adjacent an exterior wire.

An illustrative embodiment of a stripping tool is shown in FIGS. 2A and 2B. The stripping tool includes a handle 24 that has a lower arm 26 and an upper arm 28. The upper arm 28 and lower arm 26 can be fabricated by stamping steel, molding plastic, or any other methods for forming such components from metal and plastic. The upper arm 28 has a blade-carrying portion 30 and the lower arm 26 has a guiding channel 32. The guide portion 32 is configured to receive a cable 10 and guide it longitudinally relative to the blade-carrying portion 30 of the handle 24.

The blade-carrying portion 30 of the handle 24 carries a blade 33 and a blade guide 36. The blade 33 has a first blade member 35 and a second blade member 37 with a unshaped blade portion 34 disposed between them. The unshaped blade portion 34 has an open end 41 and a closed end 43. The first and second blade members 35,37 are attached at a first end 45 to the open end 41 of the u-shaped blade portion 34. As shown in FIG. 2A, a second end 47 of each blade member 35,37 includes a pin 38 which is received by a holes 40 in the blade-carrying portion 30. The blade 33, blade guide 36 and pins 38 are preferably integral and fabricated from steel. This arrangement allows the blade 33 and blade guide 36 to pivot relative to the handle 24. Alternatively, the blade 33, blade guide 36 and pins 38 can be a combination of discrete components interconnected to each other.

The upper arm 28 and lower arm 26 are pivotally attached to each other by means such as a rivet 29. The lower arm 26 and upper arm 28 may also be springably biased by means such as a spring (not shown) to a position whereby a region between the blade 33 and the guiding portion 32 of the handle 24 for receiving a cable 10 is established. Alternately, the upper arm 28 and lower arm 26 can be formed from a single piece of material using a process such as progressive die stamping. The pivoting action of the handle 24 allows the cable 10 to be forcibly brought into contact and maintained in contact with the blade 33 and blade guide 36 during the stripping operation.

The pivoting action of the blade 33 relative to the blade-carrying portion 30 of the handle 24 and the ability to forcibly engage the cable 10 against the blade 33 are key aspects of the operation of a stripping tool according to the present invention. The pivoting action of the blade 33 serves to minimize the affect of the tool orientation relative to the cable 10 during the stripping operation. It also minimizes the affect of contours in the cable 10 on the stripping action. The affect of nominal variations in the force with which the cable or wire is engaged against the blade 33 is also minimized by the pivoting action of the blade 33.

In FIG. 2A, the tool is shown with the cable 10 orientated in the guide portion 32 in a position for stripping the sheath 12 from adjacent an exterior wire 14. The guide portion 32 is configured to position the cable 10 with the exterior wire 14 adjacent the respective cutting edge 35a of the first blade member 35. In FIG. 2B, the tool is shown with the cable 10 orientated in the guide portion 32 in a position for stripping the sheath 12 from adjacent an intermediate wire 15. The guide portion 32 is further configured to position the cable 10 with the intermediate wire 15 adjacent the respective cutting edge 34a of the u-shaped blade portion 34. The u-shaped blade portion 34 enables the sheath to be stripped from adjacent an intermediate wire 15 of the cable 10.

Referring now to FIGS. 3 and 4, cross-sectional views of the first blade member 35, the u-shaped blade portion 34 and the blade guide 36 are shown. The blade 33 and blade guide 36 are constructed to provide an offset 42 between the blade members 35,37 and the blade guide 36. The offset 42 contributes to defining the maximum attainable strip depth of the tool. The u-shaped portion 39 of the blade guide 36 is approximately the same size and configuration as the u-shaped blade portion 34. For the embodiment shown, the intended function of the u-shaped portion 39 is to reduce the width of the blade guide to match the width of the blade 33. It is contemplated that other blade and blade guide configurations are possible where the u-shaped portion 39 will not be necessary.

A process commonly known as progressive die stamping can be used to fabricate the blade 33. A subsequent grinding operation may be performed to provide the respective cutting edges 35a, 34a on the first blade member 35 and the u-shaped blade portion 34. Using this type of stamping and grinding process, the blade, blade guide, and pins can be effectively and economically fabricated from a single piece of material.

In the presence of a sheath interface 22, a tool according to the present invention exhibits a self-adjusting type of operation. Effectively, the tool is self-adjusting over a range of insulation thickness whereby it is capable of stripping a sheath 12 without stripping or damaging an underlying layer of material. This self-adjusting stripping action is a key benefit of a stripping tool according to the present invention.

FIG. 5 shows a guide portion 32 having a first guiding channel 56 and second guiding channel 58. In a preferred embodiment, the first guiding channel 56 is bounded by flanges 59 for orientating the cable 10 with an intermediate wire 15 adjacent the respective cutting edge 34a of the u-shaped blade portion 34. In a preferred embodiment, the second guiding channel 58 has a generally u-shaped profile for orientating the cable 10 with an exterior wire 14 adjacent the respective cutting edge 35a of the first blade member 35. It is contemplated that a variety of other techniques for positioning an exterior wire 14 adjacent the first blade member 35 and an intermediate wire 15 adjacent the u-shaped blade portion 34 are possible. Furthermore, in another alternate embodiment, the first guiding channel 56 could be configured to position an exterior wire 14 adjacent the u-shaped blade portion 34. The key objective is providing the guide portion 32 with a structure that allows the cable to be suitably guided relative to the various regions of the blade 33.

Figure 6A:
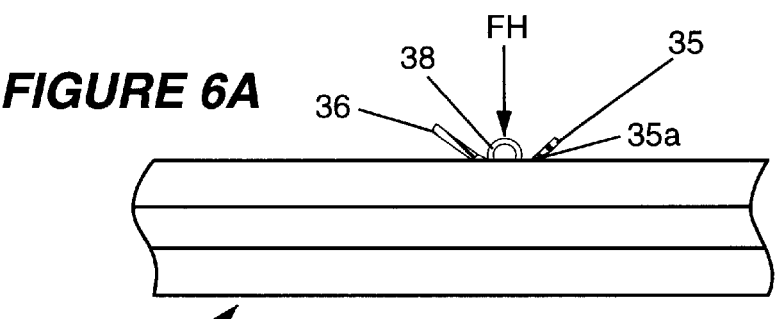
FIG. 6A is a side view showing the orientation of the blade and blade guide relative to a multi-conductor cable prior to severing the sheath.
Figure 6B:
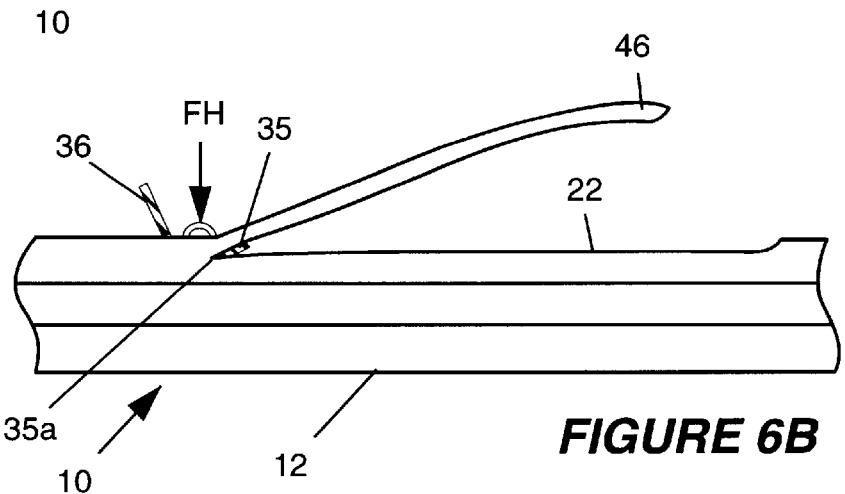
FIG. 6B is a side view showing the orientation of the blade and blade guide relative to a multi-conductor cable following the blade severing the sheath.

FIG. 6A shows a cable 10 positioned in the second guiding channel 58 such that the sheath 12 can be stripped from adjacent the exterior wire 14. When stripping the sheath 12 from adjacent the exterior wire 14, the cutting edge 35a of the first blade member 35 and the blade guide 36 rest on the sheath 12 prior to initiating the stripping operation. If a means of biasing the upper arm 28 and the lower arm 26 to an open position is incorporated into the tool, the cutting edge 35a and the blade guide 36 may not come into contact with the sheath 12 until a nominal level of force is applied on the upper arm 28 and the lower arm 26. Movement of the tool along the longitudinal axis of the cable 10 and the applied normal force FH act to initiate the cutting edge 35a severing the surface of the sheath and begin the stripping operation. Referring to FIG. 6B, the cutting edge 35a continues to cut down to the sheath interface 22 between sheath 12 and insulation 20 so long as the movement of the tool is continued and the applied normal force FH is maintained at a sufficient level.

By applying a force on the upper arm 28 and the lower arm 26 of the handle 24, an applied normal force FH which acts on the blade 33 and blade guide 36 is established. The applied normal force FH is translated to the blade 33 by the holes 40 in the blade-carrying portion 30 of the handle 24 and by the pins 38 which are attached to the blade 33. This construction is shown in FIG. 2. With grossly insufficient applied normal force FN, the blade 33 would simply slide across the surface of the sheath without cutting into it. With moderately insufficient applied normal force FH, the blade 33 might penetrate and begin stripping the material but would not reach and maintain the depth of the sheath interface 22. Controlling the applied force FH such that the tool strips properly requires that a suitable level of user skill be developed. Once the user develops this level of skill, the tool will consistently and repeatedly perform its intended function with little effort from the user.

The blade guide 36 operates to position blade 33 in a preferred orientation that is conducive for initiating the stripping operation. The angle between the blade 33 and the blade guide 36 as well as the magnitude of the offset 42 largely contribute to the orientation of the blade 33 relative to the surface of the sheath. The preferred orientation of the blade 33 is such that a sufficient, yet not excessive applied normal force FH will result in the leading edge of the blade 33 severing the sheath.

In general, the same stripping action and conditions for stripping the sheath 12 from adjacent an exterior wire 14 apply to stripping the sheath from adjacent an intermediate wire 15. However, in a preferred embodiment (FIG. 2B), the cable is placed in the tool positioned in the first guiding channel 56 between flanges 59 rather than in the second guiding channel 58. If a means of biasing the upper arm 28 and the lower arm 26 to an open position is incorporated into the tool, the cutting edge 34a and the blade guide 36 may not come into contact with the sheath 12 until a nominal level of force is applied on the upper arm 28 and the lower arm 26. Movement of the tool along the longitudinal axis of the cable 10 and the applied normal force FH act to initiate the cutting edge 34a severing the surface of the sheath and begin the stripping operation. The cutting edge 34a continues to cut down to the sheath interface 22 between the sheath 12 and the intermediate wire 15 so long as the movement of the tool is continued and the applied normal force FH is maintained at a sufficient level.

Figure 7A:
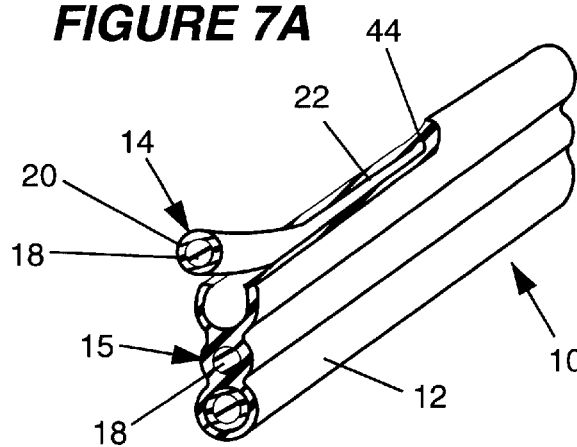
FIG. 7A is a perspective view of a multi-conductor cable with a portion of the sheath adjacent an exterior wire being stripped.
Figure 7B:
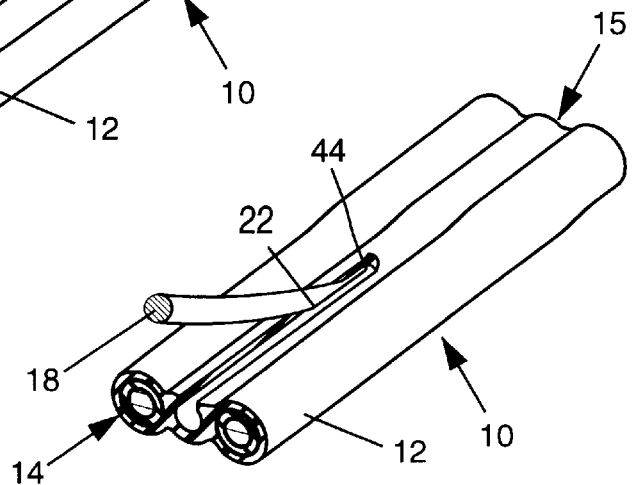
FIG. 7B is a perspective view of a multi-conductor cable with a portion of the sheath adjacent an intermediate wire being stripped.

FIG. 7A shows a cable 10 wherein the sheath 12 adjacent the exterior wire 14 has been stripped to form a stripped region 44. Similarly, FIG. 7B shows a cable 10 wherein the outer sheath 12 adjacent the intermediate wire 15 has been stripped to form a stripped region 44. Following the stripping of the sheath, the wire adjacent the stripped portion 44 can be pulled from within the sheath 12.

Several aspects of a tool according to the present invention contribute to its self-adjusting capability. The ability to control (through the upper arm 28 and lower arm 26 of the handle 24) the magnitude of the applied normal force FH which engages the cable 10 against the blade 33 is one aspect. The pivoting action of the blade 33 relative to the blade-carrying portion 30 is another aspect. A tool having a blade 33, blade guide 36, and pins 38 with a configuration as shown in FIG. 3 is yet another aspect.

The dimensions of the blade 33, the offset 42 between the cutting edges 34a, 35a of the blade 33, the dimensions of the blade guide 36, and the relative angle between the blade 33 and blade guide 36 contribute to determining the maximum attainable strip depth. Once sheath 12 is severed by the respective cutting edge 34a, 35a, the blade 33 rotates about an axis defined by an axis through the pins 38. The offset 42, as shown in FIG. 3, between the blade 33 and blade guide 36 determines the maximum strip depth. The magnitude of the offset 42 must be equal to or nearly equal to the thickness of the sheath to allow the blade 33 to reach the sheath interface 22. In a preferred embodiment where the blade 34 and blade guide 26 are unitary, the offset 42 is approximately 0.045". However, the offset 42 may be as much as twice the thickness of the sheath and will still providing the desired stripping operation. To facilitate utility of a tool of the present invention with cables having a large variation in insulation and sheath thickness, it may be desirable to employ a blade guide 36 which permits the offset 42 to be adjustable. The specific dimension of the offset 42 would be dictated by the thickness of the sheath 12.

By applying a sufficient force to the handle 24, the blade 33 is maintained at a depth preferably equal to the thickness of the sheath. As shown in FIG. 8, once the blade attains a depth at or near its maximum strip depth, the blade 33 is subjected to a negative-acting normal force FN applied by the non-stripped portion of the sheath as well as by a positive-acting normal force FP applied by the portion of the material that is being stripped. These two normal forces act in opposing directions to each other. Providing they were of equal magnitude, they would cancel each other and the blade 33 would not have a tendency to change strip depth. However, since the sheath is of a thinner cross section than the material not being stripped, the material not being stripped generates a negative-acting normal force FN of greater magnitude than the positive-acting normal force FP applied by the material that is being stripped. Absent an applied normal force FH, this imbalance in the negative-acting normal force FN and the positive-acting normal force FP results in the blade 33 having a tendency to exit the sheath. By applying sufficient force on the handle 24, the applied normal force FH and positive-acting normal force FP provide a combined normal force of a magnitude equal to or greater than the negative-acting normal force FN. This force structure maintains the blade 33 at a depth preferably equal to sheath interface 22.

Where the applied normal force FH and the positive acting normal force FP combine to provide a normal force greater than the negative-acting normal force FN, this force structure does not result in the blade 33 attempting to cut to a depth greater than the sheath interface 22 or conductor interface 23. This condition is largely due to the blade 33 being at an acute angle relative to the longitudinal axis of the cable 10 once the blade 24 attains its maximum strip depth. When acted on by the negative-acting normal force FN and positive-acting normal force FP, the profile of the blade 33 results in the normal forces maintaining the blade 33 an acute angle relative to the longitudinal axis of the wire 14 or cable 10. With the blade 33 in this orientation, an excessive force would have to be applied to the handle 24 for the blade 33 to traverse the sheath interface 22.

Although not part of a tool according to the present invention, the presence of a physical or material discontinuity between the sheath and an underlying layer of strippable material also contributes to a tool of the present invention being able to strip to a depth preferably equal to the sheath interface 22 without stripping or damaging an underlying layer of material. In the case of a physical discontinuity such as a gap between the two layers of material, the relative hardness of the sheath and the underlying material is not critical. In the case of a material discontinuity such as where the two layers of material are of substantially different hardness, the presence of a physical gap is not critical.

A physical interface or a difference in material properties can establish a sheath interface 22. So long as there is a defined separation between the sheath 12 and insulation 20, a sheath interface 22 sufficient for operation of the tool will be present. Typically, the sheath 12 is extruded over a layer of insulation 20 after the layer of insulation layer 20 is cooled to a temperature whereby the sheath 12 and insulation 20 are not thermally or molecularly bonded to each other. In this type of manufacturing process, a cable 10 with a sheath interface 22 having a finite, physical gap between the sheath 12 and insulation 20 will result. (See FIGS. 1A and 1B)

The sliver-like section 46 shown in FIG. 9A illustrates a section of the sheath 12 that is removed by the stripping tool from adjacent an exterior wire of the cable. The actual cross-sectional profile of the sliver-like section 46 is determined by the size of arch 48. In FIG. 9B, a sliver-like section 146 stripped from adjacent an intermediate wire of the cable is shown. The sliver like section 146 has an arch 148. The sizes of arch 48, 148 is controlled at least in part by the strip depth, the orientation of the blade 33 relative to the cable or wire, by the thickness of the sheath 12, and by the amount of clearance between the sheath 12 and the underlying wire.

The blade guide 36 shown in FIG. 10 includes an offset adjuster 50. The offset adjuster 50 allows for adjusting the offset to provide a required strip depth in cases of an insulation outside of a nominal thickness range for typical cables. The offset adjuster 50 includes a detent 54 which is seated in a hole 52 in the blade guide. Having a detent 54 at various locations on the offset adjuster 50 allows the offset to be adjusted to different dimensions.

In one embodiment, a tool for stripping the sheath from a flat, multi-conductor cable includes a handle having a blade-carrying portion and a guide portion for guiding the tool along the longitudinal axis of the cable. The tool includes a blade having a generally u-shaped blade portion with an open end and a closed end. The u-shaped blade portion is disposed between a first and a second elongated blade member. Each blade member is attached at a first end to the open end of the u-shaped blade portion and is attached adjacent a second end to the blade carrying portion of the handle. The u-shaped blade portion has a respective cutting edge thereon. A blade guide is attached to the blade.

In another embodiment, a tool for stripping a sheath from a flat, multi-conductor cable includes a handle having a blade-carrying portion attached to an upper arm and a guide portion for guiding the tool along the longitudinal axis of the cable attached to a lower arm. The upper arm is connected to the lower arm to provide operative movement of the arms, allowing placement of the cable in the guide portion and location of the blade proximate the cable when it is in the guide portion. The tool further includes a blade including a generally u-shaped blade portion having an open end and a closed end. The u-shaped blade portion is disposed between a first and a second elongated blade member. Each blade member is attached at a first end to the open end of the u-shaped blade portion, Each blade member has a second end including means adapted to be received by the blade-carrying portion of the handle whereby the blade is pivotably attached to the handle. The u-shaped blade portion has a respective cutting edge thereon. A blade guide is attached to the blade. The guide portion has a first guiding channel configured to position a wire of the flat multi-conductor cable adjacent the u-shaped portion of the blade.

In yet another embodiment a tool for stripping a sheath from a flat, multi-conductor cable includes a handle having a blade-carrying portion and a guide portion for guiding the tool along the longitudinal axis of the cable. The tool further includes means for stripping the sheath adjacent an intermediate wire of the multi-conductor cable. The means for stripping being pivotably attached to the blade-carrying portion of the handle. A blade guide coupled to the means for stripping. The guide portion of the handle has a guiding channel configured to position a wire of the flat multi-conductor cable adjacent the means for stripping.

A tool according to the disclosure presented herein has numerous advantages over prior tools and techniques for stripping sheath from flat multi-conductor cables. The tool strips the sheath from a flat multi-conductor cable along the longitudinal direction of the cable without damaging the underlying conductor or insulation. The tool adjusts for sheaths having different thickness. Another advantage is that the tool is constructed to slit to a depth approximately equal to the thickness of the sheath without significant effort by the user. Additionally, for flat multi-conductor cables with three or more wires in a sheath, the tool is configured to strip the sheath from adjacent the outermost wires of the cable (exterior wires) as well as the sheath from adjacent at least one wire positioned intermediate the two exterior wires.

Although the description above contains many specifics, these should not be construed as limiting the scope of the invention, but as merely providing illustrations of some of the preferred and potential embodiments of the invention at the time this application was drafted. Thus, the scope of the invention should be determined by the appended claims and their legal equivalents along with the examples and descriptions given, rather than by the examples and descriptions alone.

What is claimed is:

1. An insulation stripping apparatus, comprising:
   a blade-carrying portion;
   a guide portion attached to and movable with respect to the blade-carrying portion thereby defining a variable distance between the blade-carrying portion and the guide portion;
   a blade including two opposing ends and a generally u-shaped portion having a cutting edge thereon, the u-shaped portion extending towards the guide portion and attached between the two opposing ends of the blade and the two opposing ends being pivotally attached to the blade-carrying portion; and
   a blade guide attached to the blade.

2. The apparatus of claim 1 wherein the guide portion includes a channel having two opposing sides and wherein the u-shaped portion of the blade is positionable between the two opposing sides of the channel.

3. The apparatus of claim 1 wherein the guide portion includes two channels, a first one of the two channels having a first width and a second one of the two channels having a second width, the second width being greater than the first width.

4. The apparatus of claim 1 wherein the guide portion includes a channel defining a longitudinal axis and wherein the blade pivots about an axis extending in a direction approximately perpendicular to the longitudinal axis.

5. The apparatus of claim 1 further comprising a handle including a first arm having the blade-carrying portion attached thereto and a second arm having the guide portion attached thereto, the first arm being pivotally attached to the second arm for enabling the guide portion to be movable with respect to the blade-carrying portion.

6. The apparatus of claim 1 wherein the guide portion includes two channels, a first one of the two channels extending generally parallel to and being disposed within a second one of the two channels.

7. The apparatus of claim 6 wherein the u-shaped portion of the blade is positionable at a centerline of the second one of the two channels and wherein a centerline of the first one of the two channels is offset from the centerline of the second one of the two channels.

8. The apparatus of claim 1 wherein the blade includes two spaced apart blade members, the u-shaped portion attached between the two blade members.

9. The apparatus of claim 8 wherein at least one of the two blade members has a cutting edge thereon.

10. The apparatus of claim 8 wherein a portion of the blade guide extends generally parallel to and is offset from at least one of the two blade members.

11. The apparatus of claim 1 wherein the blade is pivotable between a first cutting position and a second cutting position with respect to the blade-carrying portion.

12. The apparatus of claim 11 wherein the blade pivots from the first cutting position towards the second cutting position during operation.

13. The apparatus of claim 11 wherein the guide portion includes a channel defining a longitudinal axis, wherein the blade defines a first cutting direction when in the first cutting position and wherein the blade defines a second cutting direction when in the second cutting position, the second cutting direction being approximately parallel to the longitudinal axis.

14. The apparatus of claim 13 wherein the first cutting direction is in angles relationship with the longitudinal axis.

15. A tool, comprising:
    a first arm;
    a second arm, a first end of the first arm pivotally attached to a first end of the second arm;
    a blade-carrying portion attached to the first arm adjacent to a second end thereof;
    a guide portion attached to the second arm adjacent a second end thereof;
    a blade including two opposing ends and a generally u-shaped portion having a cutting edge thereon, the u-shaped portion extending towards the guide portion and attached between the two opposing ends of the blade and the two opposing ends being pivotally attached to the blade-carrying portion; and
    a blade guide attached to the blade.

16. A tool, comprising:
    a handle;
    a blade-carrying portion attached to a first portion of the handle;
    a guide portion attached to a second portion of the handle, the second portion of the handle being movable with respect to the first portion of the handle thereby defining a variable distance between the blade-carrying portion and the guide portion, the guide portion including a channel defining a longitudinal axis;
    a blade including two opposing ends and a generally unshaped portion having a cutting edge thereon, the u-shaped portion extending towards the guide portion and attached between the two opposing ends of the blade and the two opposing ends being pivotally attached to the blade-carrying portion, the blade being pivotable between a first cutting position and a second cutting position with respect to the blade-carrying portion, the blade defining a first cutting direction when in the first cutting position and defining a second cutting direction when in the second cutting position, the second cutting direction being approximately parallel to the longitudinal axis; and
    a blade guide attached to the blade.

17. The tool of claim 16 wherein the blade includes two spaced apart blade members and wherein the u-shaped portion of the blade is attached between the two spaced apart blade members.

18. The tool of claim 17 wherein a portion of the blade guide extends generally parallel to and is offset from at least one of the two spaced apart blade members.

* * * * *